US012771122B2

(12) United States Patent
Wei

(10) Patent No.: US 12,771,122 B2
(45) Date of Patent: Oct. 20, 2026

(54) SURGE SUPPRESSION PROTECTION CIRCUIT

(71) Applicant: ANPEC ELECTRONICS CORPORATION, Hsinchu (TW)

(72) Inventor: Shih-Chung Wei, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 166 days.

(21) Appl. No.: 18/665,579

(22) Filed: May 16, 2024

(65) Prior Publication Data

US 2025/0279647 A1 Sep. 4, 2025

(30) Foreign Application Priority Data

Mar. 4, 2024 (TW) ................................ 113107633

(51) Int. Cl.
*H02H 9/04* (2006.01)
*H02H 1/00* (2006.01)

(52) U.S. Cl.
CPC ........... *H02H 9/04* (2013.01); *H02H 1/0007* (2013.01); *H02H 9/046* (2013.01)

(58) Field of Classification Search
CPC ........ H02H 9/04; H02H 1/0007; H02H 9/046; H02H 9/005; H02H 7/20; H02H 9/02; H02H 9/025; H02H 9/045; H02H 9/047
See application file for complete search history.

(56) References Cited

U.S. PATENT DOCUMENTS

2025/0087994 A1* 3/2025 Sun .......................... H02H 9/04

* cited by examiner

*Primary Examiner* — Daniel Cavallari
(74) *Attorney, Agent, or Firm* — Li & Cai Intellectual Property Office

(57) ABSTRACT

A surge suppression protection circuit is provided. The surge suppression protection circuit includes an input voltage detector circuit, a reference voltage generator circuit, an operational amplifier and a first switch component. A first terminal of the first switch component is coupled with an input voltage. A second terminal of the first switch component is grounded. A control terminal of the first switch component is connected to an output terminal of the operational amplifier. The input voltage detector circuit detects the input voltage to output a first input detected voltage. The reference voltage generator circuit outputs a first reference voltage. The operational amplifier amplifies a difference between the first input detected voltage and the first reference voltage by a gain to output an operational amplified signal. The first switch component operates according to the operational amplified signal from the operational amplifier.

4 Claims, 9 Drawing Sheets

SURGE SUPPRESSION PROTECTION CIRCUIT

CROSS-REFERENCE TO RELATED PATENT APPLICATION

This application claims the benefit of priority to Taiwan Patent Application No. 113107633, filed on Mar. 4, 2024. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a protection circuit, and more particularly to a surge suppression protection circuit.

BACKGROUND OF THE DISCLOSURE

A conventional surge protection device is disposed on a circuit board for preventing electronic components on the circuit board from being damaged by a large current and a high voltage caused by instantaneous changes in the voltage. The conventional surge protection device is used to guide a surge signal to a ground for suppressing an excess instantaneous high voltage of a surge of the surge signal and clamping the voltage to a clamp voltage. As a result, a working voltage of a chip on the circuit board does not exceed a breakdown voltage of the chip, so that the chip can avoid being damaged by an excessive working voltage.

However, the conventional surge protection device is not suitable for placement inside of the chip. Therefore, a user needs to purchase both the chip and the conventional surge protection device, and to additionally dispose the conventional surge protection device outside the chip on the circuit board. Hence, the conventional surge protection device occupies an area outside the chip on the circuit board, and the clamp voltage of the conventional surge protection device is limited to a voltage preset by a supplier.

SUMMARY OF THE DISCLOSURE

In response to the above-referenced technical inadequacies, the present disclosure provides a surge suppression protection circuit. The surge suppression protection circuit includes an input voltage detector circuit, a reference voltage generator circuit, an operational amplifier and a first switch component. The input voltage detector circuit is coupled with an input voltage. The input voltage detector circuit is configured to detect the input voltage to output a first input detected voltage. The reference voltage generator circuit is configured to output a first reference voltage. A first input terminal of the operational amplifier is connected to the input voltage detector circuit, and receives the first reference voltage from the input voltage detector circuit. A second input terminal of the operational amplifier is connected to the reference voltage generator circuit, and receives the first reference voltage from the reference voltage generator circuit. The operational amplifier multiplies a difference between the first reference voltage and the first reference voltage by a first gain to output an operational amplified signal. A first terminal of the first switch component is coupled with the input voltage. A second terminal of the first switch component is grounded. A control terminal of the first switch component is connected to an output terminal of the operational amplifier. The first switch component operates according to the operational amplified signal from the output terminal of the operational amplifier.

As described above, the present disclosure provides the surge suppression protection circuit. The surge suppression protection circuit of the present disclosure is not only suitable for placement outside the chip, but also suitable for placement inside the chip. The surge suppression protection circuit of the present disclosure effectively suppresses the received input voltage to prevent the core circuit inside the chip from being damaged. In particular, if the surge suppression protection circuit of the present disclosure is disposed inside the chip, a user only needs to purchase the chip but not an external surge suppression protection component, and does not need to additionally dispose the external surge suppression protection outside the chip on the circuit board for protecting the core circuit inside the chip. Furthermore, when the input voltage received by the surge suppression protection circuit of the present disclosure reaches the high voltage value, the surge suppression protection circuit is capable of quickly pulling down the input voltage to the variable clamp voltage that can be set by the user.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

Figure 1:
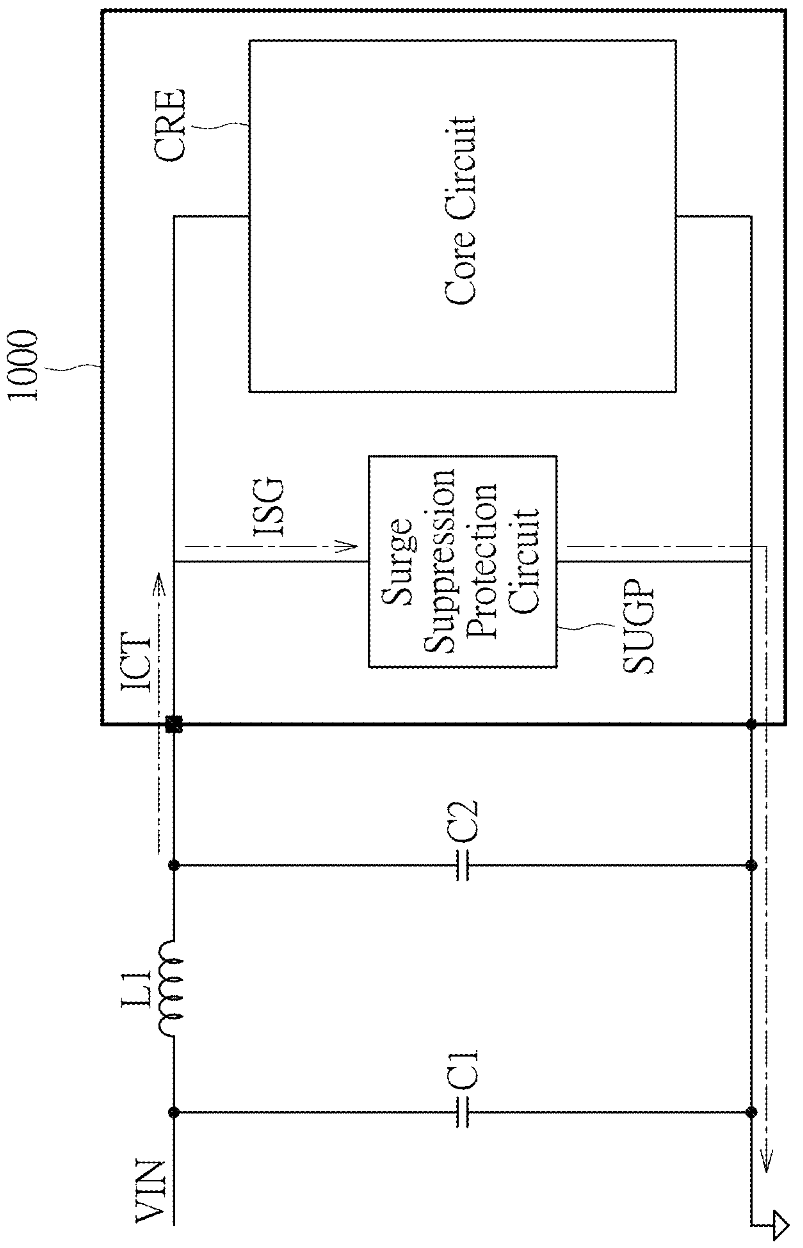
FIG. 1 is a schematic diagram of a surge suppression protection circuit disposed inside a chip according to first to sixth embodiments of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Reference is made to FIG. 1, which is a schematic diagram of a surge suppression protection circuit disposed inside a chip according to first to sixth embodiments of the present disclosure.

A conventional surge suppression protection circuit is only suitable for placement outside the chip.

It is worth noting that, a surge suppression protection circuit SUGP of the present disclosure is not only suitable for placement outside the chip, but also suitable for placement inside the chip. As shown in FIG. 1, the surge suppression protection circuit SUGP of the present disclosure and the core circuit CRE are disposed inside a chip 1000.

A circuit disposed outside the chip 1000 includes a plurality of circuit components such as, but not limited to, an external capacitor C1, an external capacitor C2 and an external inductor L1 as shown in FIG. 1. A first terminal of the external capacitor C1 and a first terminal of the external inductor L1 are coupled with an input voltage VIN. A second terminal of the external capacitor C1 and a second terminal of the external capacitor C2 are grounded. A second terminal of the external inductor L1 is connected to a first terminal of the external capacitor C2, the core circuit CRE, and the surge suppression protection circuit SUGP of the present disclosure.

When the circuit disposed outside the chip 1000 (including the external capacitor C1, the external capacitor C2 and the external inductor L1) receives the input voltage VIN to output an input current ICT into the chip 1000, an input current ISG that is a part of the input current ICT flows to the surge suppression protection circuit SUGP. The surge suppression protection circuit SUGP suppresses the input current ISG, thereby preventing the core circuit CRE inside the chip 1000 from being damaged due to overcurrent.

It is worth noting that, configurations of a plurality of circuit components inside the surge suppression protection circuit SUGP of the present disclosure are exemplified as shown in FIG. 2 to FIG. 4 and FIG. 6 to FIG. 8. The circuit disposed outside the chip 1000 is described above and is not used to limit the surge suppression protection circuit SUGP of the present disclosure, and thus is not repeated in the following description.

Figure 2:
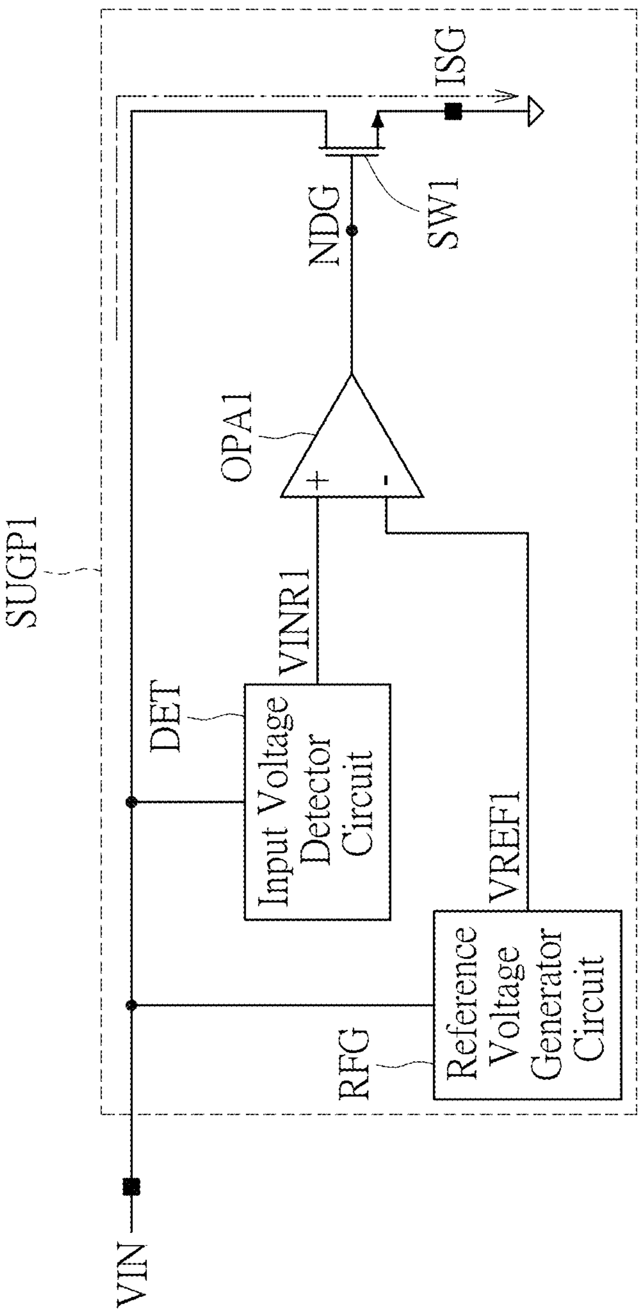
FIG. 2 is a circuit diagram of the surge suppression protection circuit according to the first embodiment of the present disclosure.

Reference is made to FIG. 2, which is a circuit diagram of the surge suppression protection circuit according to the first embodiment of the present disclosure.

The surge suppression protection circuit SUGP of the present disclosure as shown in FIG. 1 may have the same circuit component configurations as a surge suppression protection circuit SUGP1 as shown in FIG. 2.

As shown in FIG. 2, in the first embodiment, the surge suppression protection circuit SUGP1 of the present disclosure includes an input voltage detector circuit DET, a reference voltage generator circuit RFG, an operational amplifier OPA1 and a first switch component SW1. The first switch component SW1 described herein may include a transistor as shown in FIG. 2, but the present disclosure is not limited thereto.

The input voltage detector circuit DET is coupled with the input voltage VIN. A first input terminal such as a non-inverting input terminal of the operational amplifier OPA1 is connected to the input voltage detector circuit DET. A second input terminal such as an inverting input terminal of the operational amplifier OPA1 is connected to the reference voltage generator circuit RFG.

A control terminal NDG of the first switch component SW1 is connected to an output terminal of the operational amplifier OPA1. A first terminal of the first switch component SW1 is coupled with the input voltage VIN. A second terminal of the first switch component SW1 is grounded.

The input voltage detector circuit DET detects the input voltage VIN to output a first input detected voltage VINR1. The reference voltage generator circuit RFG outputs a first reference voltage VREF1.

The first input terminal such as the non-inverting input terminal of the operational amplifier OPA1 receives the first input detected voltage VINR1 from the input voltage detector circuit DET. The second input terminal such as the inverting input terminal of the operational amplifier OPA1 receives the first reference voltage VREF1 from the reference voltage generator circuit RFG.

The operational amplifier OPA1 multiplies a difference between the first input detected voltage VINR1 from the input voltage detector circuit DET and the first reference voltage VREF1 from the reference voltage generator circuit RFG by a first gain to output an operational amplified signal.

The first switch component SW1 operates according to the operational amplified signal from the output terminal of the operational amplifier OPA1.

In the first embodiment, the input voltage VIN is clamped at a clamp voltage according to the first reference voltage VREF1 outputted by the reference voltage generator circuit RFG and the first input detected voltage VINR1 outputted by the input voltage detector circuit DET in the surge suppression protection circuit SUGP1 of the present disclosure. The clamp voltage is calculated by the following equation:

$$VINCLAMP/N=VINR1=VREF1,$$

wherein VINCLAMP represents the clamp voltage of the input voltage VIN, N is a gain, VINR1 represents the first input detected voltage, and VREF1 represents the first reference voltage.

It is worth noting that, the clamp voltage VINCLAMP described herein is a variable value and may be adjusted according to actual requirements. For example, the clamp voltage VINCLAMP is adjusted by adjusting the first reference voltage VREF1.

When the first input detection voltage VINR1 is higher than N times the first reference voltage VREF1, a voltage of the operational amplified signal that is outputted to the control terminal NDG of the first switch component SW1 from the operational amplifier OPA1 is instantly pulled up. As a result, the first switch component SW1 is quickly switched from an off-state to an on-state by the operational amplifier OPA1.

When the first switch component SW1 is turned on, the input current ISG flows from the input voltage VIN through the first switch component SW1 being turned on to a ground such that the input voltage VIN is pulled down. A maximum value of the input voltage VIN is quickly maintained at a clamp voltage VINCLAMP. As a result, the core circuit CRE of the chip 1000 as shown in FIG. 1 is prevented from being damaged by the excessive input voltage VIN.

Figure 3:
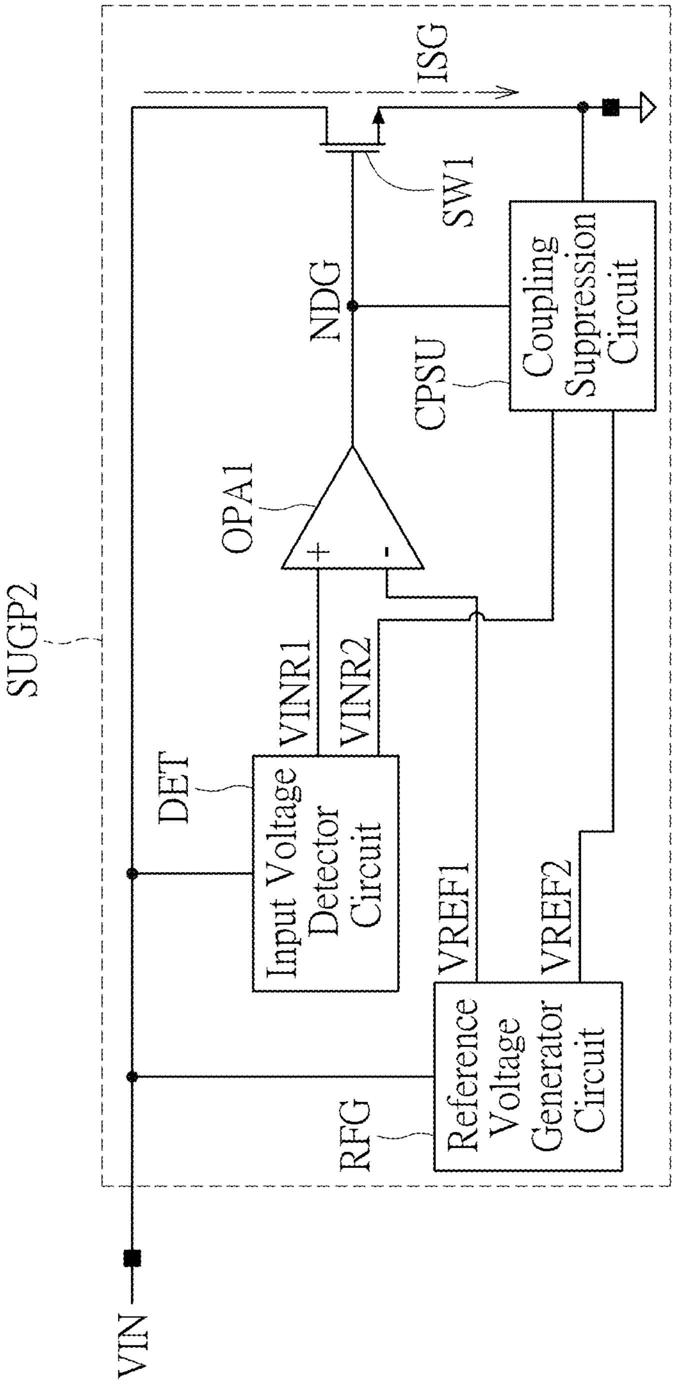
FIG. 3 is a circuit diagram of the surge suppression protection circuit according to the second embodiment of the present disclosure.

Reference is made to FIG. 3, which is a circuit diagram of the surge suppression protection circuit according to the second embodiment of the present disclosure.

The surge suppression protection circuit SUGP of the present disclosure as shown in FIG. 1 may have the same circuit component configurations as a surge suppression protection circuit SUGP2 as shown in FIG. 3.

The same descriptions of the second embodiment of the present disclosure that are the same as that of the first embodiment of the present disclosure are not repeated herein.

A difference between the second and first embodiments of the present disclosure is that, the surge suppression protection circuit SUGP2 of the second embodiment of the present disclosure not only includes the input voltage detector circuit DET, the reference voltage generator circuit RFG, the operational amplifier OPA1 and the first switch component SW1, but also includes a coupling suppression circuit CPSU.

The coupling suppression circuit CPSU is connected to the input voltage detector circuit DET, the reference voltage generator circuit RFG and the control terminal NDG of the first switch component SW1.

The input voltage detector circuit DET detects the input voltage VIN to output a second input detected voltage VINR2 to the coupling suppression circuit CPSU. The reference voltage generator circuit RFG outputs a second reference voltage VREF2 to the coupling suppression circuit CPSU.

The coupling suppression circuit CPSU controls the first switch component SW1 according to the second input detected voltage VINR2 from the input voltage detector circuit DET and the second reference voltage VREF2 from the reference voltage generator circuit RFG. For example, the coupling suppression circuit CPSU compares the second input detected voltage VINR2 with the second reference voltage VREF2 to generate a comparison signal, and controls the first switch component SW1 according to the comparison signal.

As described herein, the second reference voltage VREF2 is different from the first reference voltage VREF1. For example, the second reference voltage VREF2 is lower than the first reference voltage VREF1. The second reference voltage VREF2 may be 1/M times the input voltage VIN, wherein M is a positive value.

When the input voltage VIN has a high voltage value such that the second input detected voltage VINR2 is higher than the second reference voltage VREF2 and the first switch component SW1 is turned on by the operational amplifier OPA1, the coupling suppression circuit CPSU maintains the first switch component SW1 in the on-state for pulling down the input voltage VIN.

Then, when the input voltage VIN is pulled down such that the second input detected voltage VINR2 is lower than the second reference voltage VREF2, the coupling suppression circuit CPSU switches the first switch component SW1 from the on-state to the off-state.

That is, when the input voltage VIN is pulled down to a voltage value that does not cause a damage to the core circuit CRE inside the chip 1000 as shown in FIG. 1, the first switch component SW1 of the surge suppression protection circuit of the second embodiment of the present disclosure is turned off for stopping the input voltage VIN from being pulled down. As a result, by the surge suppression protection circuit, the core circuit CRE inside the chip 1000 is prevented from being damaged, and the core circuit CRE obtains sufficient power required for operation from the input voltage VIN.

Figure 4:
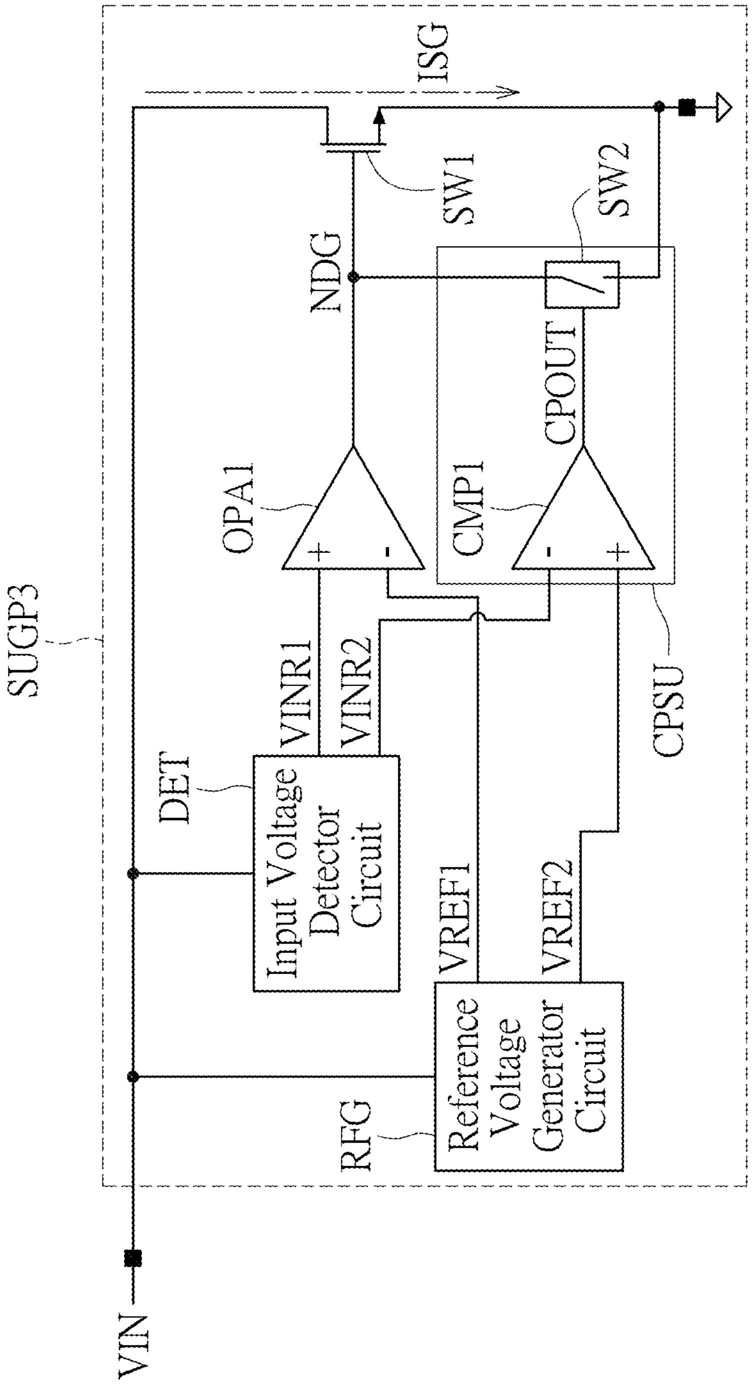
FIG. 4 is a circuit diagram of the surge suppression protection circuit according to the third embodiment of the present disclosure.

Reference is made to FIG. 4, which is a circuit diagram of the surge suppression protection circuit according to the third embodiment of the present disclosure.

The surge suppression protection circuit SUGP of the present disclosure as shown in FIG. 1 may have the same circuit component configurations as a surge suppression protection circuit SUGP3 as shown in FIG. 4.

The same descriptions of the third embodiment of the present disclosure that are the same as that of the second embodiment of the present disclosure are not repeated herein. A difference between the third and second embodiments of the present disclosure is that, the coupling suppression circuit CPSU of the surge suppression protection circuit SUGP3 of the third embodiment of the present disclosure includes a comparator CMP1 and a second switch component SW2.

A first input terminal such as an inverting input terminal of the comparator CMP1 is connected to the input voltage detector circuit DET. A second input terminal such as a non-inverting input terminal of the comparator CMP1 is connected to the reference voltage generator circuit RFG.

A control terminal of the second switch component SW2 is connected to an output terminal of the comparator CMP1. A first terminal of the second switch component SW2 is connected to the control terminal NDG of the first switch component SW1. A second terminal of the second switch component SW2 is grounded.

The first input terminal such as the inverting input terminal of the comparator CMP1 receives the second input detected voltage VINR2 from the input voltage detector circuit DET. The second input terminal such as the non-inverting input terminal of the comparator CMP1 receives the second reference voltage VREF2 from the reference voltage generator circuit RFG.

The comparator CMP1 compares the second input detected voltage VINR2 with the second reference voltage VREF2 to output a comparison signal CPOUT to the control terminal of the second switch component SW2 for controlling the second switch component SW2.

When the second input detected voltage VINR2 is lower than the second reference voltage VREF2, the comparator CMP1 outputs the comparison signal CPOUT (at a high level) to the control terminal of the second switch component SW2 for turning on the second switch component SW2.

When the second switch component SW2 is turned on, the control terminal NDG of the first switch component SW1 is grounded through the second switch component SW2 being turned on such that the first switch component SW1 is switched from the on-state to the off-state. At this time, the input current ISG supplied from the input voltage VIN stops flowing to the ground through the first switch component SW1. Therefore, the input voltage VIN stops being pulled down.

In the third embodiment, the surge suppression protection circuit SUGP3 of the present disclosure appropriately sets the first reference voltage VREF1 and the second reference voltage VREF2 for clamping the second reference voltage VREF2, thereby preventing the input voltage VIN from increasing to cause an increase in a voltage of a parasitic capacitance of the first switch component SW1, so as to pull up a voltage of the first switch component SW1. Therefore, a current of the surge suppression protection circuit SUGP3 of the third embodiment of the present disclosure does not flow into the chip 1000 as shown in FIG. 1. As a result, the core circuit CRE inside the chip 1000 is not damaged due to overcurrent.

Furthermore, the first switch component SW1 of the surge suppression protection circuit SUGP3 of the third embodiment of the present disclosure is not maintained in the on state for too long a period of time with the increase in the voltage of the parasitic capacitance of the first switch component SW1. Therefore, the input current ISG supplied from the input voltage VIN does not flow through the first switch component SW1 being turned on to the ground in large amounts and thus cannot cause excessive loss of input power.

Figure 5:
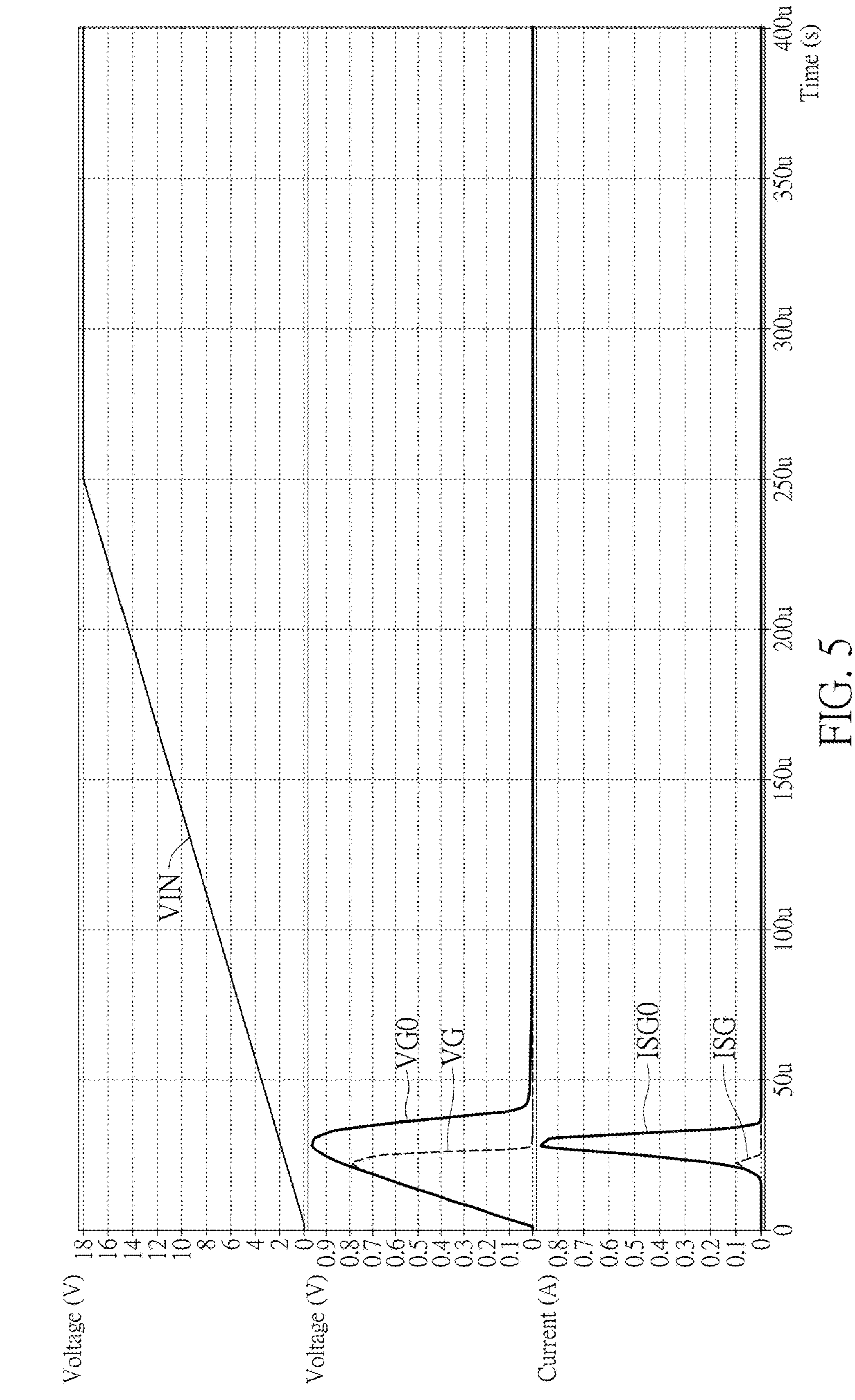
FIG. 5 is a waveform diagram of signals of the surge suppression protection circuit according to the second and third embodiments of the present disclosure.

Reference is made to FIG. 5, which is a waveform diagram of signals of the surge suppression protection circuit according to the second and third embodiments of the present disclosure.

When the input voltage VIN continually increases and the coupling suppression circuit CPSU is not disposed in the surge suppression protection circuits SUGP2 and SUGP3 of the present disclosure, a voltage signal VG0 of the control terminal NDG of the first switch component SW1 and an input current ISG0 that flows from the input voltage VIN to the surge suppression protection circuits SUGP2 and SUGP3 of the present disclosure are shown in FIG. 5.

In contrast, when the coupling suppression circuit CPSU is disposed in each of the surge suppression protection circuits SUGP2 and SUGP3 of the present disclosure, a voltage signal VG of the control terminal NDG of the first switch component SW1 has a lower voltage value, and the input current ISG that flows from the input voltage VIN to the surge suppression protection circuits SUGP2 and SUGP3 of the present disclosure has a smaller current value as shown in FIG. 5.

Therefore, it is apparent that when the coupling suppression circuit CPSU is disposed in each of the surge suppression protection circuits SUGP2 and SUGP3 of the present disclosure, a signal suppression effect of the surge suppression protection circuits SUGP2 and SUGP3 of the present disclosure is further effectively improved.

Figure 6:
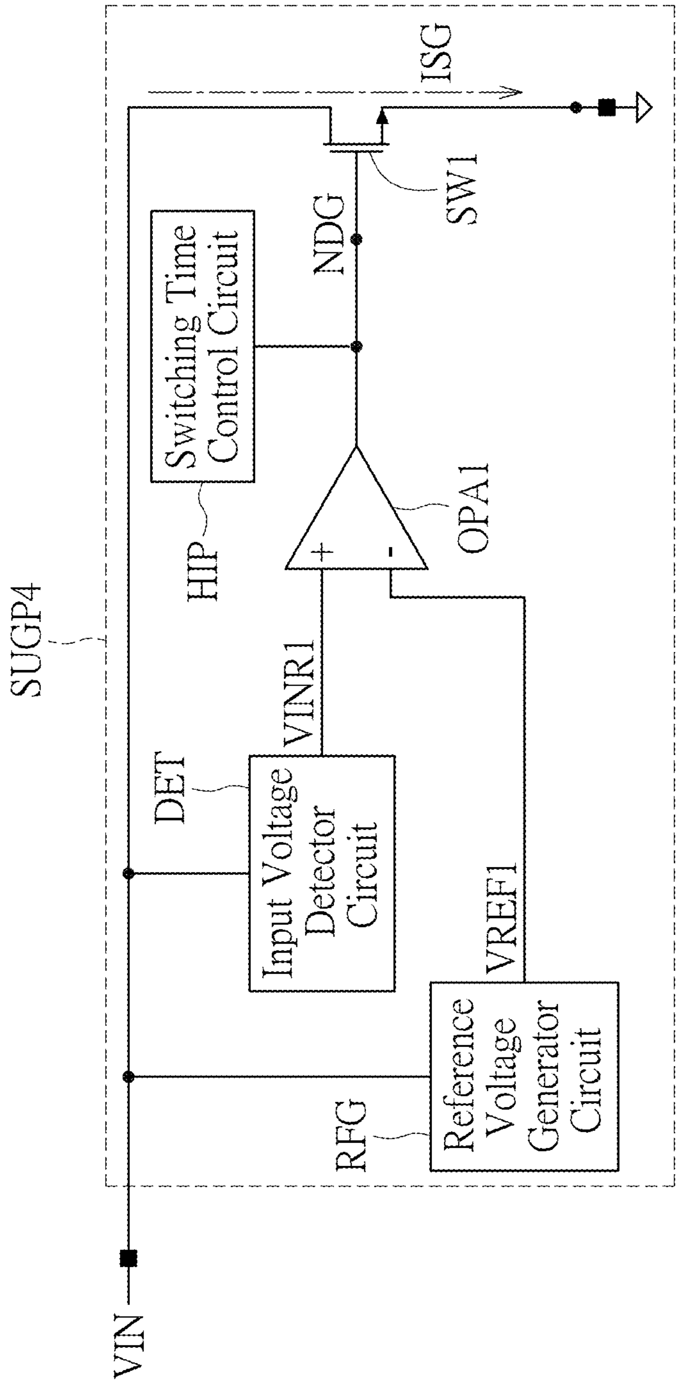
FIG. 6 is a circuit diagram of the surge suppression protection circuit according to the fourth embodiment of the present disclosure.

Reference is made to FIG. 6, which is a circuit diagram of the surge suppression protection circuit according to the fourth embodiment of the present disclosure.

The surge suppression protection circuit SUGP of the present disclosure as shown in FIG. 1 may have the same circuit component configurations as a surge suppression protection circuit SUGP4 as shown in FIG. 6.

The same descriptions of the fourth embodiment of the present disclosure that are the same as that of the first embodiment of the present disclosure are not repeated herein.

A difference between the fourth and first embodiments of the present disclosure is that, the surge suppression protection circuit SUGP4 of the fourth embodiment of the present disclosure not only includes the input voltage detector circuit DET, the reference voltage generator circuit RFG, the operational amplifier OPA1 and the first switch component SW1, but also includes a switching time control circuit HIP.

The switching time control circuit HIP is connected to the control terminal NDG of the first switch component SW1.

The switching time control circuit HIP may time an on-time of the first switch component SW1, and may further control the first switch component SW1 according to the on-time of the first switch component SW1.

When the switching time control circuit HIP determines that the on-time of the first switch component SW1 that is turned on continually does not reach an on-time length threshold, the switching time control circuit HIP maintains the first switch component SW1 in the on-state.

Further, when the switching time control circuit HIP determines that the on-time of the first switch component SW1 that is turned on continually reaches the on-time length threshold, the switching time control circuit HIP switches the first switch component SW1 from the on-state to the off-state.

In addition or alternatively, the switching time control circuit HIP may time an off-time of the first switch component SW1, and control the first switch component SW1 according to the off-time of the first switch component SW1.

When the switching time control circuit HIP determines that the off-time of the first switch component SW1 that is turned off continually does not reach an off-time length threshold, the switching time control circuit HIP maintains the first switch component SW1 in the off-state.

Further, when the switching time control circuit HIP determines that the off-time of the first switch component SW1 that is turned off continually reaches the off-time length threshold, the switching time control circuit HIP switches the first switch component SW1 from the off-state to the on-state.

In the fourth embodiment, the switching time control circuit HIP of the present disclosure controls the on-time and the off-time of the first switch component SW1. The switching time control circuit HIP turns on the first switch component SW1 for a sufficient period of time to pull down the input voltage VIN to be lower than or equal to a withstand voltage of the core circuit CRE inside the chip 1000 as shown in FIG. 1, but does not turn on for too long a period of time such as to cause damage to the first switch component SW1. Therefore, the surge suppression protection circuit SUGP4 is capable of providing overvoltage protection to the core circuit CRE inside the chip 1000.

Figure 7:
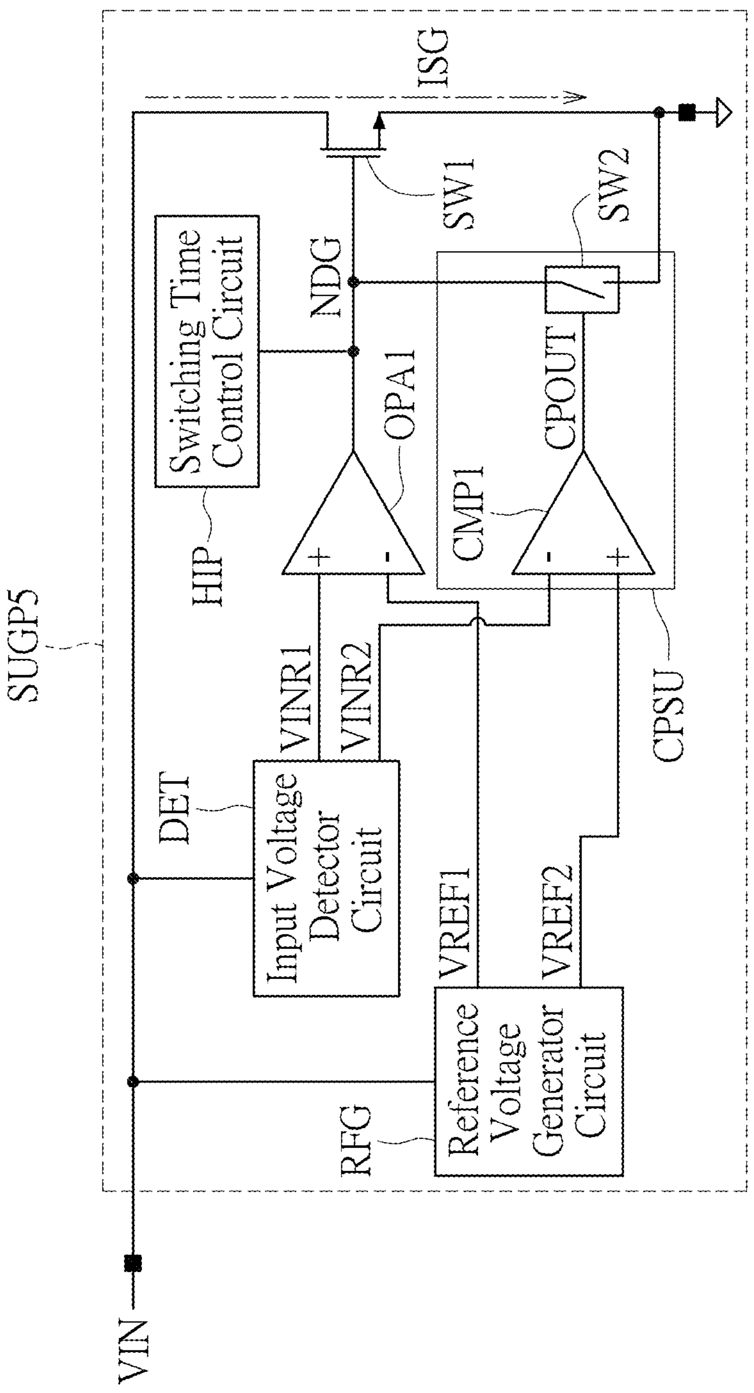
FIG. 7 is a circuit diagram of the surge suppression protection circuit according to the fifth embodiment of the present disclosure.

Reference is made to FIG. 7, which is a circuit diagram of the surge suppression protection circuit according to the fifth embodiment of the present disclosure.

The surge suppression protection circuit SUGP of the present disclosure as shown in FIG. 1 may have the same circuit component configurations as a surge suppression protection circuit SUGP5 as shown in FIG. 7.

As shown in FIG. 7, in the fifth embodiment, the surge suppression protection circuit SUGP5 of the fifth embodiment of the present disclosure not only includes the input voltage detector circuit DET, the reference voltage generator circuit RFG, the operational amplifier OPA1 and the first switch component SW1, but also includes both of the coupling suppression circuit CPSU and the switching time control circuit HIP that are described above.

The descriptions of the fifth embodiment of the present disclosure that are the same as that of the first to fourth embodiments of the present disclosure are not repeated herein.

Figure 8:
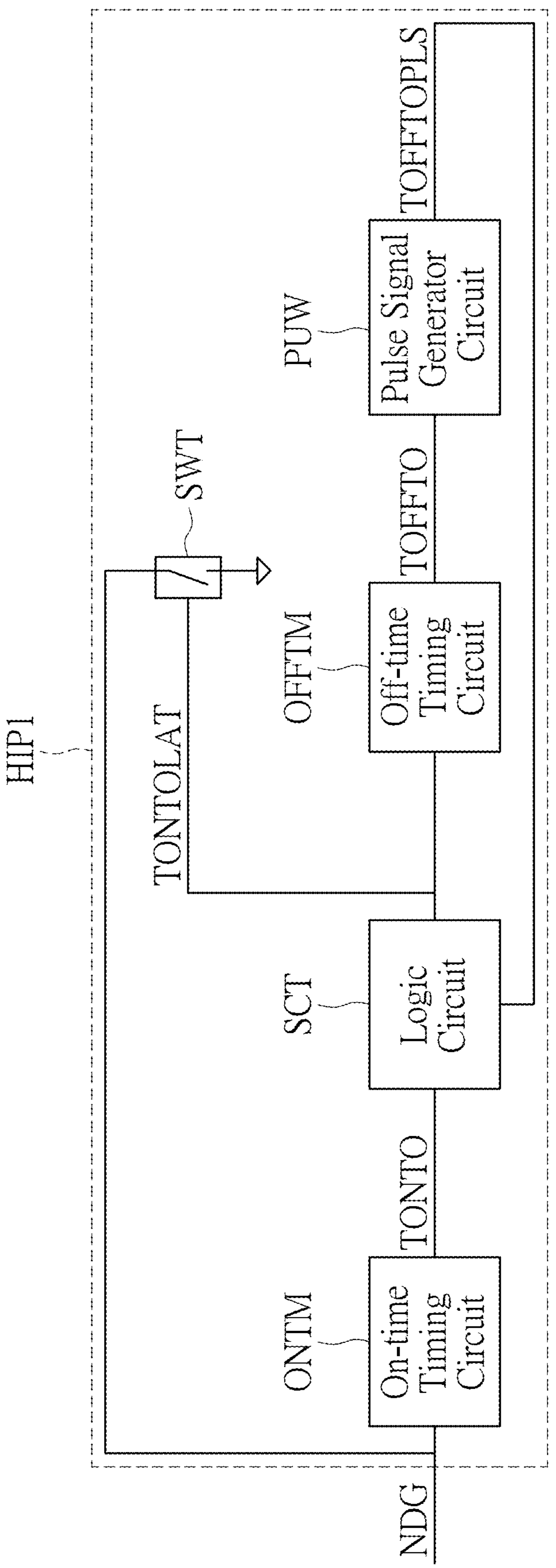
FIG. 8 is a circuit diagram of a switching time control circuit of the surge suppression protection circuit according to the sixth embodiment of the present disclosure.
Figure 9:
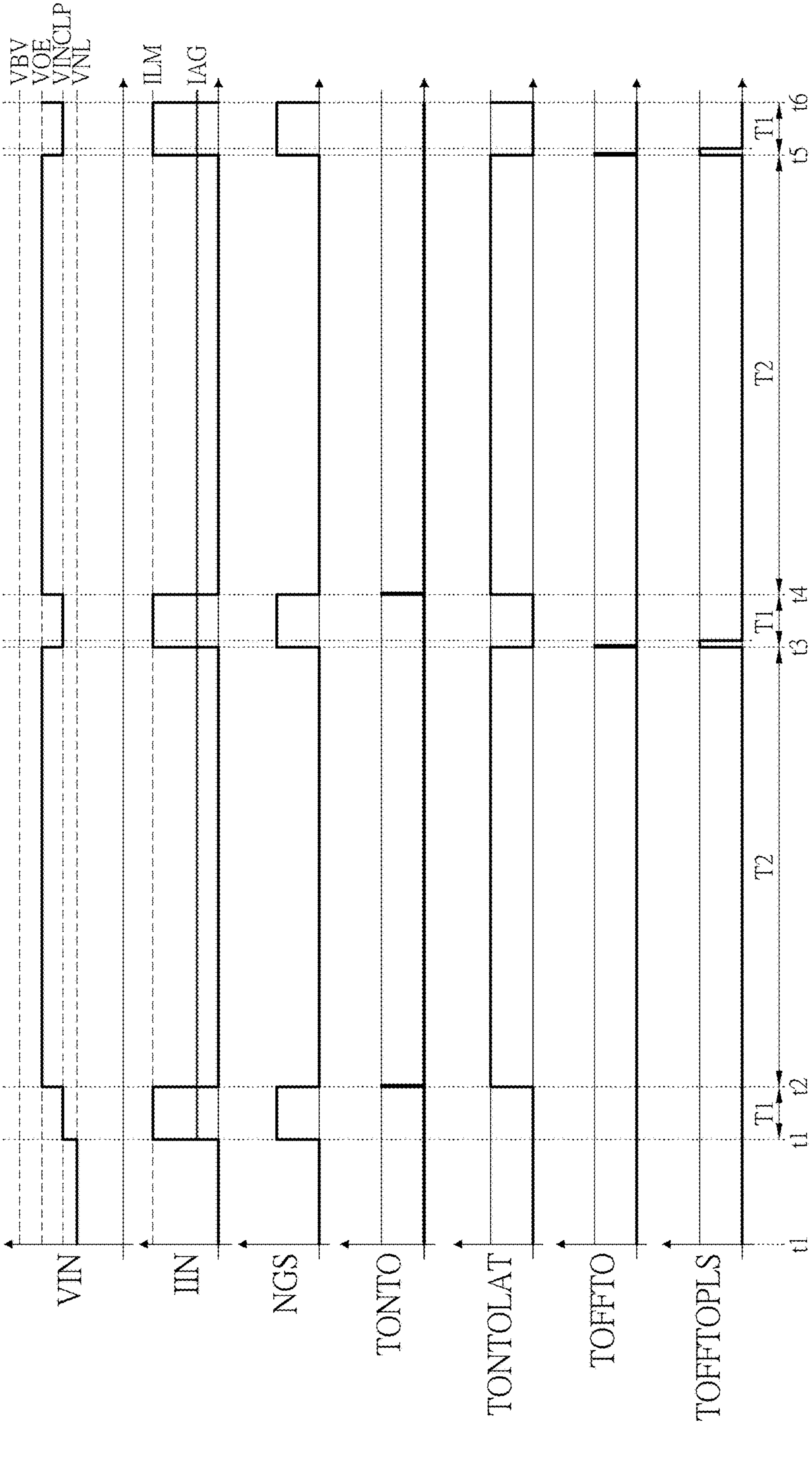
FIG. 9 is a waveform diagram of signals generated when and before the surge suppression protection circuit is used according to the sixth embodiment of the present disclosure.

Reference is made to FIG. 8 and FIG. 9, in which FIG. 8 is a circuit diagram of a switching time control circuit of the surge suppression protection circuit according to the sixth embodiment of the present disclosure, and FIG. 9 is a waveform diagram of signals generated when and before the surge suppression protection circuit is used according to the sixth embodiment of the present disclosure.

The switching time control circuit HIP of the surge suppression protection circuit of the present disclosure as shown in FIG. 6 or FIG. 7 may have the same circuit component configurations as a switching time control circuit HIP1 as shown in FIG. 8.

As shown in FIG. 8, the switching time control circuit HIP1 includes an on-time timing circuit ONTM, a switching component SWT, a logic circuit SCT, an off-time timing circuit OFFTM and a pulse signal generator circuit PUW, one or more of which may be omitted in practice.

The on-time timing circuit ONTM is connected to an input terminal of the logic circuit SCT. An output terminal of the logic circuit SCT is connected to a control terminal of the switching component SWT and an input terminal of the off-time timing circuit OFFTM. An output terminal of the off-time timing circuit OFFTM is connected to an input terminal of the pulse signal generator circuit PUW. An output terminal of the pulse signal generator circuit PUW is connected to an input terminal of the logic circuit SCT.

The on-time timing circuit ONTM may determine whether the first switch component SW1 is in the on-state, according to a voltage signal of the control terminal NDG of the first switch component SW1 (or the voltage of the operational amplified signal that is outputted to the control terminal NDG of the first switch component SW1 from the operational amplifier OPA1).

When the first switch component SW1 is turned on, the on-time timing circuit ONTM times the on-time of the first switch component SW1 to output an on-time timing signal TONTO.

For example, when the input voltage VIN is higher than the clamp voltage VINCLP as shown in FIG. 9, the first switch component SW1 is turned on and the voltage of the control terminal of the first switch component SW1 is pulled up to a balance value. At the same time, the on-time timing circuit ONTM starts timing.

The logic circuit SCT outputs a logic signal TONTOLAT to the control terminal of the switching component SWT according to the on-time timing signal TONTO from the on-time timing circuit ONTM.

When the on-time of the first switch component SW1 (that is time T1 during which a voltage signal NGS of the control terminal NDG of the first switch component SW1 reaches a high level as shown in FIG. 9) reaches the on-time length threshold, the on-time timing circuit ONTM outputs the on-time timing signal TONTO at a first level (such as a high level as shown in FIG. 9) to the logic circuit SCT within a specified time (that is short time).

The logic circuit SCT, according to the on-time timing signal TONTO at the first level (such as the high level as shown in FIG. 9), outputs the logic signal TONTOLAT at the first level to the control terminal of the switching component SWT.

As shown in FIG. 9, at a time point t2, the logic signal TONTOLAT that is outputted to the control terminal of the switching component SWT by the logic circuit SCT transits from a low level to a high level, and a rising edge of a waveform of the logic signal TONTOLAT is aligned with a rising edge of a waveform of the on-time timing signal TONTO.

As shown in FIG. 9, within time T2, the logic signal TONTOLAT that is outputted to the control terminal of the switching component SWT by the logic circuit SCT is maintained at the high level such that the switching component SWT is maintained in the on-state. As a result, the voltage signal NGS of the control terminal NDG of the first switch component SW1 is maintained at the low level such that the first switch component SW1 is maintained in the off-state.

Further, the off-time timing circuit OFFTM determines whether the first switch component SW1 is in the off-state according to the voltage signal of the control terminal NDG of the first switch component SW1 or the logic signal TONTOLAT outputted to the off-time timing circuit OFFTM by the logic circuit SCT.

Alternatively, the off-time timing circuit OFFTM may determine whether the switching component SWT is in the on-state according to the voltage signal of the control terminal of the switching component SWT or the logic signal TONTOLAT outputted to the switching component SWT by the logic circuit SCT. The off-time timing circuit OFFTM may time an on-time of the switching component SWT, and calculates the off-time of the first switch component SW1 according to the on-time of the switching component SWT. For example, the off-time of the first switch component SW1 is equal to the on-time of the switching component SWT.

The off-time timing circuit OFFTM times the off-time of the first switch component SW1 to output an off-time timing signal TOFFTO to the control terminal of the switching component SWT.

When the off-time of the first switch component SW1 (such as the time T2 as shown in FIG. 9) reaches the off-time length threshold, the off-time timing circuit OFFTM outputs the off-time timing signal TOFFTO at the first level (such as the high level as shown in FIG. 9) to the pulse signal generator circuit PUW within a specified time (that is short time).

At a time point t3, the pulse signal generator circuit PUW, according to the off-time timing signal TOFFTO at the first level (such as the high level as shown in FIG. 9) from the off-time timing circuit OFFTM, generates a pulse wave having a preset width in a pulse signal TOFFTOPLS and outputs the pulse signal TOFFTOPLS to the logic circuit SCT.

When the logic circuit SCT receives the pulse signal TOFFTOPLS at the first level (such as the high level as shown in FIG. 9) from the pulse signal generator circuit PUW, the logic circuit SCT outputs the pulse signal TOFFTOPLS at a second level (such as a low level as shown in FIG. 9) to the control terminal of the switching component SWT. As a result, the switching component SWT is switched from the on-state to the off-state.

When the switching component SWT is switched from the on-state to the off-state, the voltage signal NGS of the control terminal NDG of the first switch component SW1 transits from the low level to the high level as shown in FIG. 9 such that the first switch component SW1 is switched from the off-state to the on-state.

When the first switch component SW1 is switched from the off-state to the on-state, the input voltage VIN coupled with the first terminal of the first switch component SW1 is pulled down as shown in FIG. 9. As shown in FIG. 9, a working voltage value VOE of the input voltage VIN is maintained within a range from a breakdown voltage VBV of the first switch component SW1 to a clamp voltage VINCLP for periods of times. The input current ICT flowing into the chip 1000 as shown in FIG. 1 may be the same as an input current IIN as shown in FIG. 9. In FIG. 9, ILM represents a current limit value of the input current IIN, and IAG represents an average current value of the input current IIN flowing into the chip 1000.

In the sixth embodiment, the switching time control circuit HIP1 of the surge suppression protection circuit of the present disclosure controls the on-time and the off-time of the first switch component SW1. The switching time control circuit HIP1 turns on the first switch component SW1 for a sufficient period of time to pull down the input voltage VIN to be lower than or equal to the withstand voltage of the core circuit CRE inside the chip 1000 as shown in FIG. 1, but does not turn on for too long a period of time to cause a damage to the first switch component SW1. Therefore, the surge suppression protection circuit of the present disclosure is capable of providing overvoltage protection to the core circuit CRE inside the chip 1000.

When the input voltage VIN does not exceed the breakdown voltage VBV of the first switch component SW1 (that is a transistor) but exceeds the clamp voltage VINCLP for a long period of time, the switching time control circuit HIP1 of the surge suppression protection circuit of the present disclosure effectively reduces the input current ISG. As a result, the first switch component SW1 is not turned on for too long a period of time to cause damage to the first switch component SW1.

In conclusion, the present disclosure provides the surge suppression protection circuit. The surge suppression protection circuit of the present disclosure is not only suitable for placement outside the chip, but also suitable for placement inside the chip. The surge suppression protection circuit of the present disclosure effectively suppresses the received input voltage to prevent the core circuit inside the chip from being damaged. In particular, if the surge suppression protection circuit of the present disclosure is disposed inside the chip, a user only needs to purchase the chip but not an external surge suppression protection component, and does not need to additionally dispose the external surge suppression protection outside the chip on the circuit board for protecting the core circuit inside the chip. Furthermore, when the input voltage received by the surge suppression protection circuit of the present disclosure reaches the high voltage value, the surge suppression protection circuit is capable of quickly pulling down the input voltage to the variable clamp voltage that can be set by the user.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A surge suppression protection circuit, comprising:

an input voltage detector circuit coupled with an input voltage and configured to detect the input voltage to output a first input detected voltage;

a reference voltage generator circuit configured to output a first reference voltage;

an operational amplifier, wherein a first input terminal of the operational amplifier is connected to the input voltage detector circuit and receives the first reference voltage from the input voltage detector circuit, a second input terminal of the operational amplifier is connected to the reference voltage generator circuit and receives the first reference voltage from the reference voltage generator circuit, and the operational amplifier multiplies a difference between the first reference voltage and the first reference voltage by a first gain to output an operational amplified signal;

a first switch component, wherein a first terminal of the first switch component is coupled with the input voltage, a second terminal of the first switch component is grounded, a control terminal of the first switch component is connected to an output terminal of the operational amplifier, and the first switch component operates according to the operational amplified signal from the output terminal of the operational amplifier; and a coupling suppression circuit connected to the input voltage detector circuit, the reference voltage generator circuit and the control terminal of the first switch component;

wherein the input voltage detector circuit detects the input voltage to output a second input detected voltage to the coupling suppression circuit, and the reference voltage generator circuit outputs a second reference voltage to the coupling suppression circuit;

wherein the coupling suppression circuit controls the first switch component according to the second input detected voltage and the second reference voltage.

2. The surge suppression protection circuit according to claim 1, wherein the first switch component includes a transistor.

3. The surge suppression protection circuit according to claim 1, wherein the coupling suppression circuit compares the second input detected voltage with the second reference voltage to generate a comparison signal, and controls the first switch component according to the comparison signal.

4. The surge suppression protection circuit according to claim 1, wherein the coupling suppression circuit includes:

a comparator, wherein a first input terminal of the comparator is connected to the input voltage detector circuit and receives the second input detected voltage from the input voltage detector circuit, and a second input terminal of the comparator is connected to the reference voltage generator circuit and receives the second reference voltage from the reference voltage generator circuit; and a second switch component, wherein a control terminal of the second switch component is connected to an output terminal of the comparator, a first terminal of the second switch component is connected to a control terminal of the first switch component, and a second terminal of the second switch component is grounded.

* * * * *